United States Patent
Strehlow et al.

(10) Patent No.: US 6,480,609 B1
(45) Date of Patent: Nov. 12, 2002

(54) APPARATUS FOR SUPPRESSING STRUCTURE BORNE NOISES

(75) Inventors: Henning Strehlow, Munich (DE); Peter Jaenker, Garching (DE); Rudolf Maier, Miesbach (DE)

(73) Assignee: Eurocopter Deutschland GmbH, Munich (DE)

( * ) Notice: Subject to any disclaimer, the term of this patent is extended or adjusted under 35 U.S.C. 154(b) by 0 days.

(21) Appl. No.: 09/277,483

(22) Filed: Mar. 26, 1999

(30) Foreign Application Priority Data

Mar. 28, 1998 (DE) .......................... 198 13 959

(51) Int. Cl.[7] .......................... H03B 29/00; H04R 27/00
(52) U.S. Cl. .................... 381/71.1; 381/71.2; 381/71.4; 381/86
(58) Field of Search ............................. 381/71.1, 71.4, 381/71.2, 86, 94.1; 267/136–141

(56) References Cited

U.S. PATENT DOCUMENTS

| | | |
|---|---|---|
| 3,900,748 A | 8/1975 | Adler |
| 4,868,447 A | 9/1989 | Lee et al. |
| 5,378,974 A | 1/1995 | Griffin |
| 5,645,260 A | 7/1997 | Falangas |
| 5,919,029 A * | 7/1999 | Van Nostrand et al. ....... 381/71 |
| 6,002,778 A * | 12/1999 | Rossetti et al. ............ 381/71.4 |
| 6,105,900 A | 8/2000 | Welsh et al. |
| 6,138,947 A | 10/2000 | Welsh et al. |
| 6,229,898 B1 * | 5/2001 | Goodman ................... 381/71.4 |

FOREIGN PATENT DOCUMENTS

| | | |
|---|---|---|
| DE | 4033089 | 3/1992 |
| EP | 0529637 | 3/1993 |
| EP | 0593160 | 4/1994 |
| GB | 2222657 | 3/1990 |
| JP | 10271852 | 10/1998 |

* cited by examiner

*Primary Examiner*—Forester W. Isen
*Assistant Examiner*—Laura A. Grier
(74) *Attorney, Agent, or Firm*—W. F. Fasse; W. G. Fasse

(57) ABSTRACT

Body or structural noise transmitted through a connector such as a strut, that connects a noise source, such as an engine, to an enclosure, such as a passenger cabin or cell of a helicopter, is suppressed by at least one piezoactuator which is excited to counteract any vibrations of the strut caused by body noise so that body noise vibrations are cancelled or at least substantially suppressed. The excitation of the piezoactuator is controlled in closed loop fashion in response to feedback signals from a sensor secured to the connector.

9 Claims, 2 Drawing Sheets

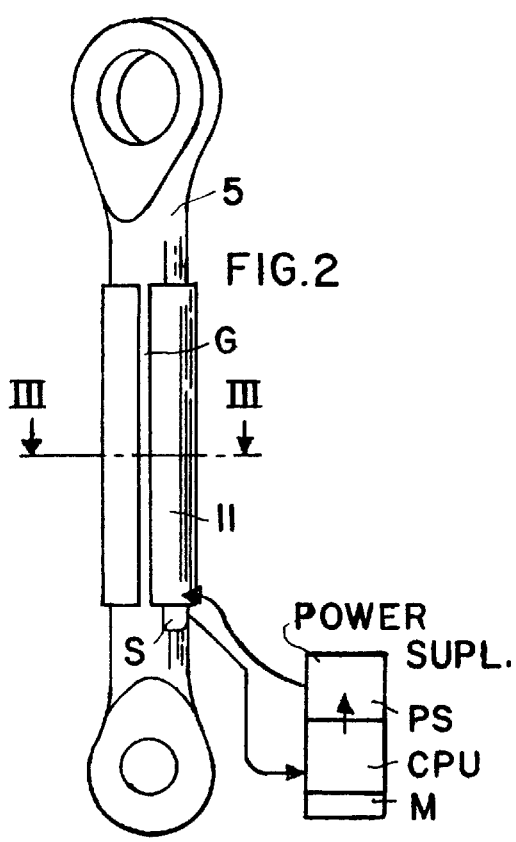
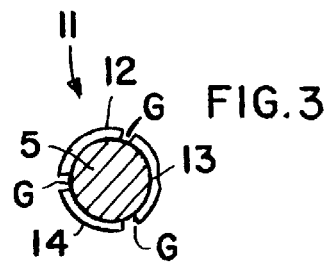
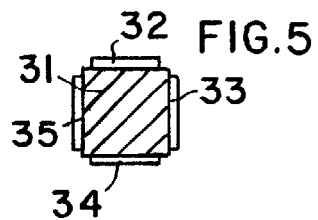
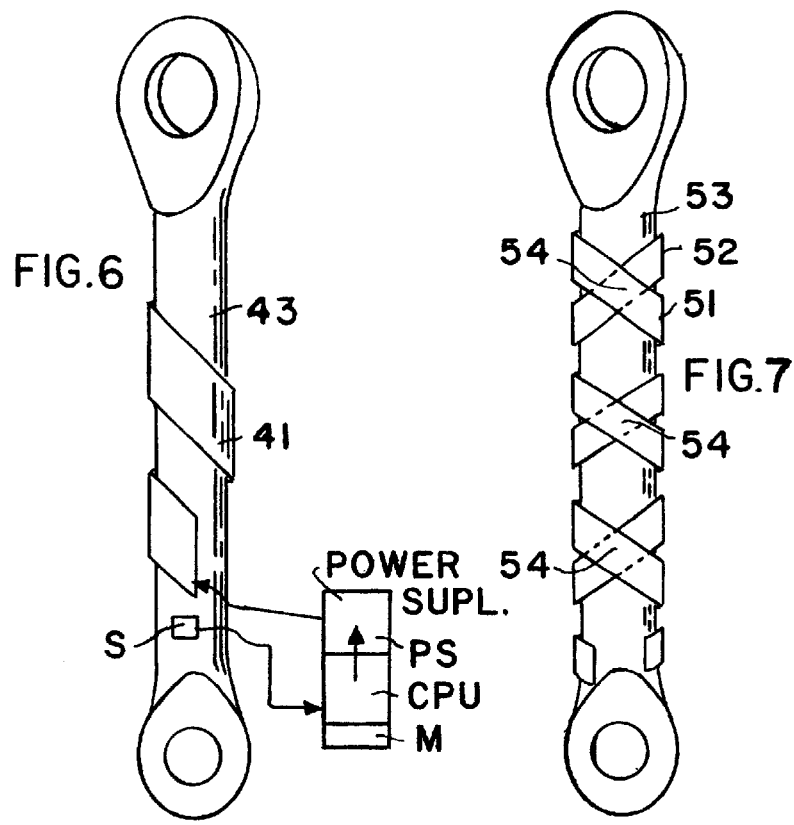

APPARATUS FOR SUPPRESSING STRUCTURE BORNE NOISES

PRIORITY CLAIM

This application is based on and claims the priority under 35 U.S.C. §119 of German Patent Application 198 13 959.4, filed on Mar. 28, 1998, the entire disclosure of which is incorporated herein by reference.

FIELD OF THE INVENTION

The invention relates to an apparatus for suppressing body noise also referred to as structure borne noise, for example in a carrier structure that connects a noise source to a structural component such as an enclosure for example the cell of a helicopter.

BACKGROUND INFORMATION

It is known, for example in connection with the mounting of a helicopter power plant to the helicopter cell by connector struts to suppress body noise by an active reduction in the body noise transmission. Such active reduction is accomplished by counteracting or compensating body noise caused by primary loads by counterforces and moments in the form of secondary loads which are controlled in closed loop fashion. Such compensation, is for example realized by means of magnetostrictive or piezoelectric actuators in connection with a respective inertia mass which introduce the required counterforces or moments into the carrier or connector struts.

The actuators are conventionally secured to a first end of the mounting strut or carrier structure and preferably in the longitudinal direction of the strut or carrier structure. An inertia mass is secured to the opposite or second end of the strut or carrier structure. The actuators move the inertia masses secured to the strut or carrier structure in response to the movements of the struts or carrier structure, thereby causing a superposition of two motions or vibrations, namely the motion of the inertia masses motion at the foot of the strut or carrier structure is superposed on the motion of the strut or carrier structure in such a way that the two motions cancel each other at least partially, whereby body noise is suppressed. This superposition of motions or vibrations takes place in the frequency range of the body noise. Therefore, the conventional devices are capable of at least partially suppressing the transmission of body noise from the power plant to the helicopter cell.

The relatively large weight of the above described conventional noise damping structure is a disadvantage, especially an aircraft such as helicopter structures. The weight includes the actuators and the inertia masses as well as the spatial integration of the structure into the strut or carrier structure. Another disadvantage of the above conventional construction is seen in that the combination of actuators with inertial masses has been found to be wanting with regard to achieving the intended noise reduction to a desirable extent. Thus, there is room for improvement.

OBJECTS OF THE INVENTION

In view of the above it is the aim of the invention to achieve the following objects singly or in combination:

- to provide a device for the suppression of body noise more efficiently than was possible heretofore, while substantially reducing the weight of such body noise suppression devices;
- to suppress or even eliminate the transmission of noise caused by noise source vibrations and oscillations, through a connector strut or carrier structure from the noise source, such as the main power plant, to an enclosure, such as a helicopter cell or other structural components, such as a vehicle body, while achieving the suppression or elimination in a simple construction that is easily integrated into a connector strut or carrier structure;
- to completely avoid the use of additional inertia masses by using system masses for the body noise compensation, particularly the mass of the main power plant of a helicopter; and
- to control the excitation of piezoactuators in closed loop fashion for the noise suppression or noise isolation of the enclosure from the higher frequency noise generation of a power plant including a power transmission.

SUMMARY OF THE INVENTION

The piezoactuator is integrated into or bonded to the connector, for example by a suitable adhesive, whereby the piezoactuators elements are preferably piezoelectric elements that can be excited by a controlled power source which in turn is controlled in closed loop fashion so that the actuators cause a blocking of the body noise transmission in the longitudinal direction of the struts as well as in the transversal direction and even in the torsion direction around the struts or connectors. According to the invention the body noise compensation or suppression is accomplished by using system inertia masses, e.g. the power plant mass, particularly in a helicopter.

It is an advantage of the invention that the piezoelectric actuators are directly applied, for example by adhesives to the connectors without the use of any additional inertia components. More specifically, the attachment of inertia masses to one end of the connectors is altogether avoided according to the invention, whereby the manufacturing costs of the body noise suppression devices according to the invention are substantially reduced, compared to the above described prior art. Another advantage of the invention is seen in that the application or integration of the piezoactuators in or to the connectors is simple and the weight of these actuators is substantially smaller compared to conventional structures that require additional mass for the noise suppression. Moreover, these piezoelectric actuators require but little space. As a result, the body noise suppression devices according to the invention are especially suitable for lightweight structures. Yet another advantage of the invention is seen in the substantially improved effectiveness in the noise reduction or suppression as compared to the above prior art.

In a preferred embodiment several piezoactuator layers or strips are applied to the connector and each of these layers or strips may be individually controlled by its respective power source, whereby countervibrations can be generated for different vibration patterns of the connector. By integrating the piezoactuators as taught herein directly into the mechanical connector between the noise source and an enclosure, in combination with a control program for the excitation of the piezoelectric actuators, it is possible to achieve a noise isolation of the enclosure or structural component from the higher frequency excitations of a respective engine such as a power plant including a transmission.

BRIEF DESCRIPTION OF THE DRAWINGS

In order that the invention may be clearly understood it will now be described in connection with example embodiments, with reference to the accompanying drawings, wherein:

FIG. 2 shows a connector strut having a circular cross-section to which three piezoelectric actuator shells in the form of layers or strips are secured for introducing noise suppressing countervibrations in the longitudinal, as well as in the transversal direction of the connector strut;

FIG. 3 shows a sectional view in the section plane III—III in FIG. 2 to illustrate the circumferential distribution of the three piezoactuator layers or strips;

FIG. 4 shows a cross-sectional view similar to that of FIG. 3, but illustrating a strut with a triangular cross-section carrying three piezoelectric strips;

FIG. 5 is a sectional view similar to that of FIG. 3, but showing a strut with a square cross-section carrying four piezoactuator strips;

FIG. 6 is a view similar to that of FIG. 2, but showing a strut with a helically wound piezoactuator strip attached to a strut, particularly for torque induced noise suppression; and FIG. 7 is a view similar to that of FIG. 6, however showing two piezoactuator strips wound around the strut to form two helixes so that simultaneously two oscillation or waveforms can be introduced into the strut also particularly for torque induced noise suppression.

Figure 1:
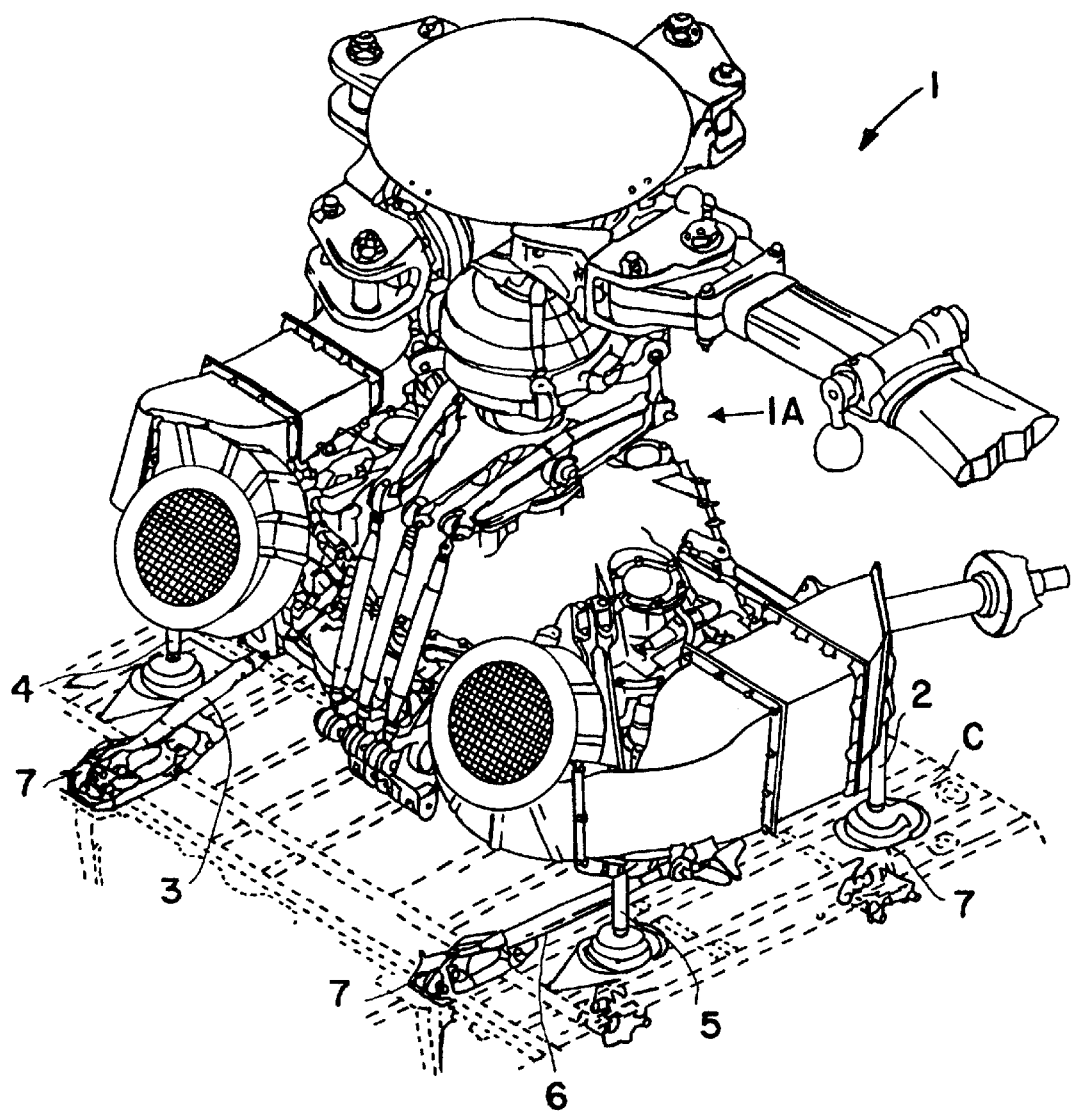
FIG. 1 shows a perspective view of the carrier structure of a helicopter power plant including a main power transmission connected to a helicopter cell by connector struts to which the piezoactuators are attached according to the invention.

DETAILED DESCRIPTION OF PREFERRED EXAMPLE EMBODIMENTS AND OF THE BEST MODE OF THE INVENTION

FIG. 1 shows a main power plant 1 including an engine and a transmission 1A of a helicopter. The transmission 1A is connected through connector struts 2, 3, 4, 5, and 6 to an enclosure which in this example embodiment is helicopter passenger cell C. The power plant 1 and transmission 1A form a noise source that generates most of the noise in a helicopter. The struts 2, 3, 4, 5, 6 are connected to the cell through mounting brackets 7.

According to the invention piezoactuators, such as piezoelectric strips, are integrated into or bonded to the connector struts 2 to 6 for introducing oscillations or vibrations into these connectors in such a manner that the inertia mass of the power plant including the transmission 1A is effectively used in the generation of secondary compensating vibrations or oscillations that suppress primary noise signals generated by the power plant and transmission. Secondary control signals to be described in more detail below are introduced into the piezoactuators for generating secondary vibrations or oscillations that are superposed on the primary vibrations or oscillations to thereby cancel or at least substantially dampen the primary oscillations or vibrations, thereby preventing the transmission of noise from the noise source into the cell C. The connector struts 2, 3, 4, 5, 6 shown in FIG. 1 are, for example, equipped with piezoelectric actuators as shown in FIGS. 2 to 7.

Referring to FIGS. 2 and 3 in conjunction, a connector rod or strut 5 carries three piezoelectric strips 12, 13 and 14. These strips are elongated shells 11, each covering a sector on the surface of the strut 5, thereby leaving gaps G between neighboring strips or shells 11. These strips are secured to the strut by adhesive bonding, for example. The shell layers 11 cover substantially the entire length of the strut 5, except that the connector eye ends are not covered. The shell strips 11 extend in parallel to the longitudinal axis of the strut 5.

Referring further to FIG. 2, a vibration sensor S is secured to the strut 5 to provide primary vibration signals that are supplied to a central processing unit CPU including a memory M for controlling a power supply or source PS, the output of which is connected to the piezoelectric actuator strips 12, 13 and 14 to excite these strips in a closed loop fashion. A control program is stored in the memory M. The output exciter signals of the power source PS are generated as secondary signals in response to the primary signals from the sensors S in such a way that the superposition of the vibrations or oscillations of the piezoelectric strips caused by the secondary signals will oppose the body noise vibrations or oscillations of the connector 5 caused by the primary signals emanating from the power plant and transmission. The counter waveforms or oscillations may be of a determined configuration such as sinus waves or they may be of a random, stoichastic configuration within a frequency range limited by the frequency range of the primary vibrations.

In FIG. 4 the strut or connector 24 has a triangular cross-section and carries three flat piezoactuator strips 21, 22 and 23 covering substantially the surface area and length of the triangular prism in the longitudinal direction of the strut 24 but leaving gaps at the corners.

In FIG. 5 the strut 31 has a square cross-section and carries four piezoactuator strips 32, 33, 35 and 35 extending substantially along the entire length of the strut 31 but leaving gaps at the corner.

In the embodiments of FIGS. 2, 3, 4 and 5, the vibrations imposed on the struts by the piezoactuators are effective longitudinally and transversely of the struts for noise suppression.

The transmission of body noise from the noise source to the cell C is suppressed by the arrangement of the piezostrips as shown in FIGS. 3, 4 and 5. However, other configurations or rather cross-sectional shapes for the struts are possible. In all configurations the strips will extend longitudinally substantially from end-to-end of the struts or connectors. Different carrier structures involving, for example the mountings that secure a passenger car body to the chassis may also be equipped with piezoactuators as taught herein. The arrangement of the piezoelectric strips will always take into account the type of vibration or oscillation that is to be suppressed by a closed loop control.

FIG. 6 shows a strut 43 to which a piezoelectric strip 41 has been attached, for example by adhesive bonding, in the shape of a helical winding. This type of arrangement of the piezoactuator 41 is capable of introducing torsion vibrations into the strut 43 to thereby counteract or compensate for respective torsion induced vibrations of the strut.

FIG. 7 shows an arrangement where two piezoactuator strips 51 and 52 are bonded to the strut 53 in the form of two helical configurations that form two helixes with different pitches. The strips 51 and 52 partially overlap each other in the areas 54 whereby two layers of piezoelectric strip material will cover the areas 54 of the respective strut surface. By differently activating the two strips 51 and 52, the embodiment of FIG. 7 is capable of generating longitudinal vibrations, torsional vibrations and transversal vibrations in the carrier structure such as the strut 53.

The helical arrangement of the piezoactuator strips for suppressing torsion vibrations in the strut or carrier structure may be combined with other arrangements of the piezoelectric actuators, whereby certain overlap vibration patterns may be formed if longitudinally extending strips pass over helically wound strips or vice versa. Such arrangements according to the invention are capable of suppressing longitudinal vibrations, transversal vibrations, and torsional vibrations or oscillations.

When adhesively bonding the piezoactuators to the carrier structure or struts, the type of operation of the particular strut or carrier structure will be taken into account. Further, a certain biasing compression may be applied to the piezostrips, for example, by a mechanical tension stressing of the strut or carrier structure and/or by heating of the piezolayers on the strut or carrier structure and/or electrical compression of the piezolayers.

In order to sense the vibrations of the struts, a vibration sensors will be attached to the struts or carrier structure as also shown in FIGS. 2 and 6 for providing a closed loop control of the generation of the secondary excitation signals by sensed primary signals through the CPU and the power supply PS.

Furthermore, a portion of any piezoelectric strip may be used as a vibration sensor for providing a signal representing the secondary vibrations or oscillations that are being introduced into the strut or carrier structure, whereby the secondary signals or vibrations may be monitored or compared with the primary signals or vibrations.

The piezoactuators can be applied according to the invention to any connector component provided the connector component has a length sufficient for generating in the connector component a secondary vibration or oscillation that is capable of suppressing the primary noise generating vibrations or oscillations. The teaching of the invention is particularly suitable for noise insulating a passenger cell such as the body of a helicopter or a vehicle body from the noise source such as the power plant.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A helicopter comprising a power plant having an inertia mass and forming a source of noise causing primary vibrations, a helicopter cell, at least one straight elongated strut having a first end connected to said power plant and an opposite second end connected to said helicopter cell, whereby said source of primary noise with said inertia mass is connected to said helicopter cell, at least one elongated piezoactuator secured to and positioned on said at least one straight elongated strut for introducing into said at least one straight elongated strut longitudinal, torsional and transversal secondary vibrations, a noise sensor for sensing said primary vibrations and a power source connected to said noise sensor and to said piezoactuator for exciting said piezoactuator for generating said secondary vibrations for suppressing said primary vibrations, wherein said inertia mass of said power plant is effectively used in said generating of said secondary vibrations.

2. The helicopter of claim 1, wherein said at least one elongated piezoactuator has an elongated strip configuration which is secured to said at least one straight elongated strut in parallel to a longitudinal axis of said at least one straight elongated strut.

3. The helicopter of claim 1, wherein said at least one elongated piezoactuator has an elongated strip configuration which is wound around and secured to said at least one straight elongated strut.

4. The helicopter of claim 3, wherein said elongated piezoactuator strip is wound as a helix around said at least one straight elongated strut.

5. The helicopter of claim 1, wherein said at least one elongated piezoactuator comprises two elongated piezoactuator strips which are wound as two helixes around said at least one straight elongated strut.

6. The helicopter of claim 5, wherein said two helixes have opposite pitches relative to each other.

7. The helicopter of claim 1, wherein said at least one elongated piezoactuator comprises a plurality of elongated strips that are secured to said at least one straight elongated strut in parallel to each other with a spacing between neighboring strips.

8. The helicopter of claim 1, further comprising a power supply conductor connecting an output of said power source to said elongated piezoactuator, a control unit having a control output electrically connected to a control input of said power source for energizing said elongated piezoactuator, wherein said noise sensor is a vibration sensor secured to said at least one straight elongated strut for providing a feedback signal to said control unit for controlling said power source in response to control signals dependent on said feedback signal from said vibration sensor, and a feedback signal conductor connecting said sensor to said control unit for controlling said elongated piezoactuator in closed loop fashion.

9. The helicopter of claim 1, further comprising means for applying a compression biasing stress to said at least one elongated piezoactuator.

* * * * *

UNITED STATES PATENT AND TRADEMARK OFFICE
CERTIFICATE OF CORRECTION

PATENT NO. : 6,480,609 B1
DATED : November 12, 2002
INVENTOR(S) : Strehlow et al.

It is certified that error appears in the above-identified patent and that said Letters Patent is hereby corrected as shown below:

Title page,
Item [56], FOREIGN PATENT DOCUMENTS, before "*cited by the examiner", insert the following:
-- OTHER PUBLICATIONS
Proceedings of ISMA21, 1996 International conference on Noise and Vibration Engineering, Leuven, September 18 - 20, 1996, pages 315 to 328 --.

Column 2,
Line 15, "SUMMARY OF THE INVENTION", insert the following paragraph:
-- According to the invention there is provided an apparatus for suppressing body or structure borne noise that can be transmitted from a noise source to an enclosure, such as from the power plant and transmission of a helicopter to the cell of the helicopter, whereby the noise source is connected to the cell by struts or a carrier structure forming generally a connector. A piezoactuator is secured to the connector along the length of the connector and a power source for activating or exciting the piezoactuator is connected to the piezoactuator for suppressing or eliminating the body noise by compensating for the noise body excitation caused by the noise source, by a counter excitation of the piezoactuator without any additional inertia masses. --

Signed and Sealed this

Twenty-fifth Day of March, 2003

JAMES E. ROGAN
*Director of the United States Patent and Trademark Office*